Patented Oct. 23, 1951

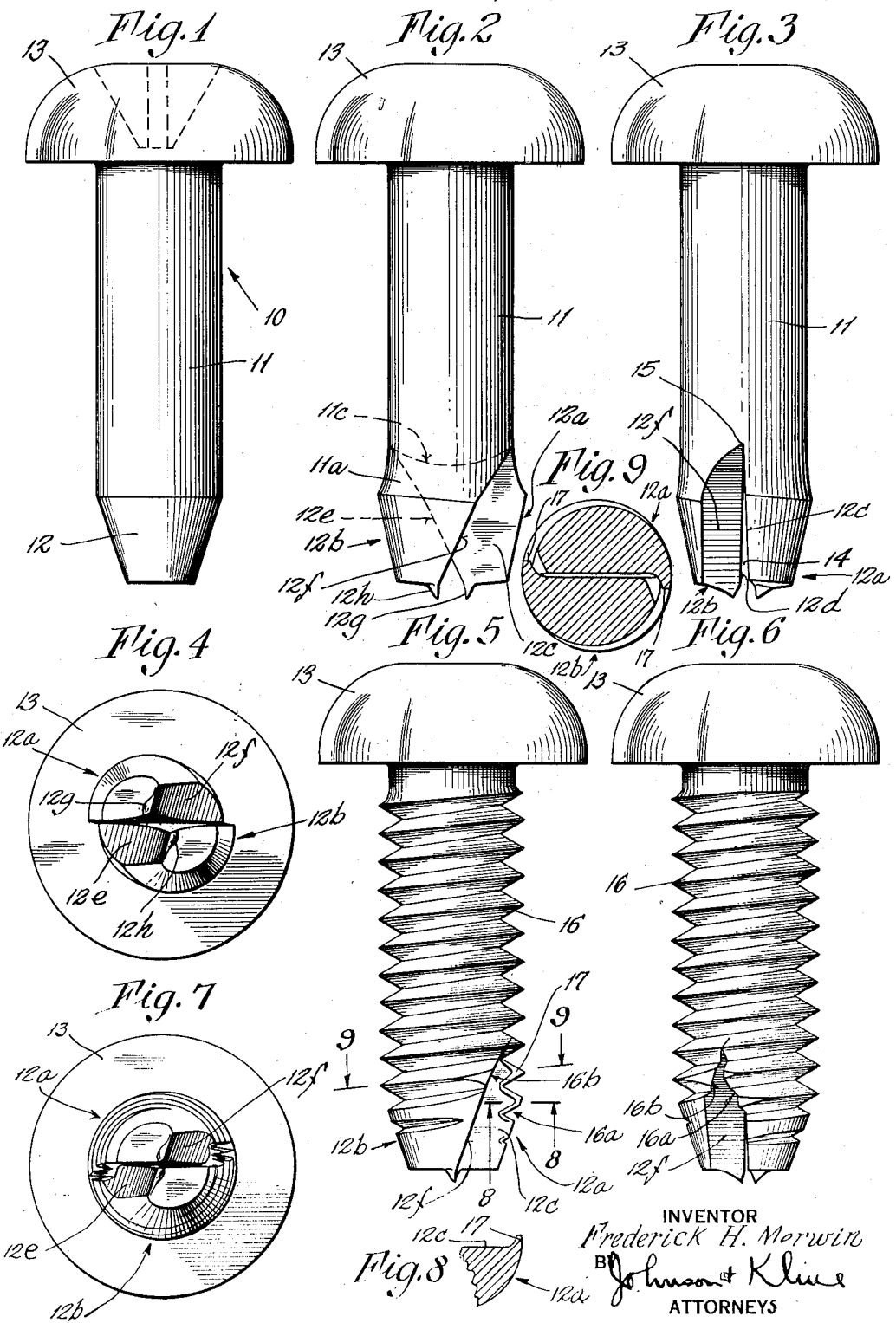

2,572,647

UNITED STATES PATENT OFFICE 2,572,647

SELF-THREADING FASTENER

Frederick H. Merwin, Milford, Conn., assignor to Milford Rivet and Machine Company, Milford, Conn., a corporation of Connecticut Application February 9, 1945, Serial No. 577,098

7 Claims. (Cl. 85—47)

This invention in its broader aspects relates to thread-cutting or forming, and more particularly to self-tapping screw fasteners and to the method of making same.

Attempts have been made in the past to produce threaded fastening devices in the form of slotted shank machine screws which may be applied to a smooth hole of predetermined diameter and rotated so that threads are produced in the walls of the hole simultaneously with the drawing in of the screw to securing position.

Notwithstanding the fact that a large number of such proposals have been made, the actual commercially practicable and available products resulting from the proposals have been few, and these few have had a number of drawbacks, so that they were not successful under all conditions of use. For instance, where ease of insertion is required, and heavy loading or vibration is to be withstood, these prior self-tapping fastening devices have not met with success.

In these commercially produced screws, dependence is had on a combination of cutting and swaging operations to form the threads in the walls of the hole, with most of the forming being done by the swaging due to the starving of material at the slotted end portion of the shank. This is manifestly unsatisfactory process where cast iron is the material into which the screw is to be driven, since cast iron cannot be made to cold flow, and as a result the threads of the tapping screw are materially damaged, and a poor factening produced. Even where the material is not of cast iron, but of a nature which permits cold flowing or swaging, the threads of the screw became damaged, and where this material has a thickness as great as ⅜" or ½", the mutilation is considerable.

Also, due to the considerable swaging action of these prior screws, the threads they produce are not as deep or as well formed and strong as threads which have been cut in the conventional manner using standard taps, because of the mutilation of the screw threads which occurs during the driving in of the screw, as mentioned above.

Most of the swaging or internal rolling done by the screw threads is accomplished by that portion of the screw shank not interrupted or slotted, and the only space provided for the swaged metal to flow to is the clearance between the roots of the screw threads and the walls of the hole. This clearance is made fairly large to reduce the excessive force required to start and to drive home the screw, and thus shallow threads are formed in the walls of the hole, having poorly formed roots since the screw threads are not strong enough to properly swage a thread. The overall result has been a poor fastening. Moreover, the size of the hole may not be made large enough so that the required starting and driving force of the screw is reduced to a satisfactory or desirable value for quick assembly operations, since this would reduce to an unsatisfactory value the load which the fastening could withstand.

While these commercially produced slotted shank screws have been designed to enable a yielding of the land to take place, theoretically to provide a radial relief so that the cutting face may bite into the walls of the hole, in actual practice only a small portion of the land circumference yields, so that forming the threads by cutting alone or substantially alone cannot be accomplished, and swaging by the screw thread crests is inevitably depended on to deepen the threads in the hole. The swaging action necessarily results in a screw fastening which requires considerable force to start in a hole, and to drive home, since there is a tendency for the rubbing surfaces to seize each other, and to bind.

In other instances screws have been proposed which were intended to produce threads largely by cutting, but due to the arrangement provided, the depth of the cut thread in practice has not been sufficiently great to prevent a subsequent swaging action as the driving in of the screw is continued, for the reason that the portions of the screw doing the cutting have not been substantially immovably supported or backed up to adequately cut the thread. Such screws have therefore not proved to be commercially practicable.

All of these prior self-tapping screws have had to be produced by a costly process, moreover, this process generally involving milling or machining slots in the screw shank, the slots providing for chip clearance and theoretically for relieving of the threaded land portions.

According to the present invention the disadvantages and drawbacks of these prior self-tapping fastening devices have been overcome. This is accomplished by the provision of a commercially practicable self-tapping screw which has thread-profile cutting surfaces followed by radially relieved lands, so that a true cutting action is obtained. The arrangement is such that the cutting surfaces and lands are rigidly supported so that they do not yield, as in prior devices, when the screw is driven into a hole. Preferably, in rigidly supporting the cutting surfaces and lands having same, the latter are so formed as to have engaging backing surfaces which reinforce them to prevent yielding.

As a result, threads are produced in the hole mainly by cutting, and where strength and resistance of the fastening to heavy loads and vibration are paramount considerations, these threads may have a depth more closely approaching that produced by standard taps whose lands do not yield. Or, where only ordinary loading is involved, the cutting action of the screw of the present invention may be advantageously employed with a somewhat oversized hole to reduce considerably the driving force necessary to insert the screw into the hole and provide adequate threads therein, so that desirable quickness and ease of assembly operations may be had.

In the embodiment of the invention illustrated herein as exemplary thereof, the tapered tip and an adjacent part of the smooth shank of a screw blank are diametrically sheared in such a manner that the two divided portions thus formed are displaced from each other along the line of shear. The blank is then passed between thread-rolling dies so arranged that a clean and sharp thread is rolled in the shank and in the sheared portions of the blank, forming thread-profile cutting faces on the displaced sheared surfaces.

This thread-rolling operation is such that the sheared portions are formed and pressed inwardly at their profiled leading or cutting faces to conform with the helix of the thread of the rest of the shank. However, in view of the original conical and subsequently offset semi-conical shapes of the screw-end, the lands, i. e. parts of threads trailing the cutting faces, are relieved, in the manner of standard taps.

The profiled cutting faces thus in effect project to enable them to bite into the smooth walls of the hole and cut a thread therein, rather than depend on flowing or swaging the metal. Also, spaces are formed between the leading or cutting faces, and the adjacent trailing or heel surfaces of the portions, by offsetting and only partially resetting the divided portions, to provide clearance for chips. These spaces may be quite large if the divided portions are swaged, while they are being sheared, to cause the heel surfaces of the portions to be angularly spaced from the adjacent sheared leading or cutting surfaces.

Thus, although the cutting edges of the sheared portions are rolled so they lie in the thread helix, a land relief as well as a substantial clearance space for chips is produced.

During the thread-rolling operation the two sheared portions which have been spread apart slightly by the shearing in a direction such that their sheared surfaces are spaced apart, are restored to the extent that the sheared surfaces substantially engage each other or are closely juxtaposed, thereby providing a backing up of each portion by the other portion against appreciable movement toward the axis of the screw. As a result of this, together with the rough character of the torn surfaces of the two portions, which prevents slippage between these surfaces, the sheared portions are rigidly supported and prevented from skewing or yielding during the thread-cutting operation. Therefore, when the screw of the present invention is applied to a hole and driven in, forming a thread in the walls is accomplished mainly by cutting, and the depth of the cut threads may be greater than that obtained with prior self-tapping screws. Consequently, the succeeding threads on the screw shank are not mutilated, and the screw therefore will withstand greater loads. Also, the screw may be employed to thread holes which are deeper, as found in thicker material, and may be successfully used with such materials as cast iron, where forming the threads by cutting and not swaging is essential. Due to the swaging action being practically entirely eliminated, the screw will not bind or seize when being driven in, so that less driving force is required.

Also, since the screw is formed by a quick and simple combined shearing and swaging operation, followed by an economical thread-rolling operation, a saving of time and cost is effected as compared with the prior machined-slot construction. When it is considered that millions of such screws are produced daily, this saving amounts to a substantial aggregate sum.

Other features and advantages will hereinafter appear.

In the accompanying drawings:

Figure 1 is an enlarged side elevation of a screw blank as provided by the invention.

Fig. 2 is a similar view of the blank, after the tip and adjacent shank portion have been sheared and swaged in a single operation.

Fig. 3 is a view similar to Fig. 2, but taken at right angles to the latter.

Fig. 4 is a tip-end elevation of the blank of Fig. 2.

Fig. 5 is a side elevation after a thread has been rolled in the shank of the blank.

Fig. 6 is an elevation similar to Fig. 5, but taken at right angles to the latter.

Fig. 7 is a tip-end elevation of the screw of Fig. 5.

Fig. 8 is a fragmentary section taken on the line 8—8 of Fig. 5, and

Fig. 9 is a transverse section taken on the line 9—9 of Fig. 5.

As shown, the self-tapping screw embodying the present invention is formed from a headed screw blank 10 comprising a generally cylindrical shank 11 one end of which has a tapered or frustro-conical tip 12, the other end of the shank having the usual or desired type of screwhead 13.

The blank 10 is placed in a suitable support or nest, in a machine, and the tapered tip 12 together with the adjacent portion 11a of the shank, is sheared substantially axially along a longitudinal plane, and swaged, as shown in Figs. 2 and 3. This operation forms a two-part bifurcated or divided tip the parts of which are offset radially, that is, spaced apart slightly at the shear plane, as shown at 14 in Fig. 3. The tip portions 12a and 12b thus formed are substantially identical in shape, each having sheared surfaces 12c and 12d and heel surfaces 12e and 12f respectively, the latter surfaces being preferably formed by the swaging or cold flow of the tip portions coincidentally and simultaneously with the shearing thereof, and being angularly located with respect to the shear surfaces.

By this arrangement, as shown in Figs. 2, 3 and 4, substantial spaces are provided between the heel surfaces 12e and 12f, and the respective adjacent shear surfaces 12d and 12c.

Referring to Figs. 2 and 3, the shearing and swaging operation spreads the shank portion 11a so that it is greater in girth than the remainder of the shank. Also, the tip portions 12a and 12b are offset with respect to each other along the line of shearing, as shown in Figs. 2 and 4.

The shear between the portions 12a and 12b of the tip terminates along a curved line 11c, shown dotted in Fig. 2, indicating that the two portions are joined together, at their interiors, beyond the extremities 15 of the exterior cuts.

During the shearing and swaging operation small bits 12g and 12h may form on the tip portions 12a and 12b respectively, but these are merely incidental to the operation and serve no function.

After the blank 10 has been sheared and swaged as shown in Figs. 2, 3 and 4, it is placed between thread-rolling dies and a thread 16 rolled into the shank 11 and tip portions 12a and 12b, as shown in Figs. 5 and 6. During this thread-rolling operation the tip portions 12a and 12b are swaged and to some extent moved back toward the shape the tip had before the shearing. However, these portions still remain offset with respect to each other along the direction of the shear plane, while the outer surfaces of the portions have threads which form a continuation of the threads of the rest of the shank. These threaded surfaces thus comprise lands which function similarly to those of a standard tap, and due to the fact that the thread is rolled, a swaging and forming action occurs at the offset tip portions which results in the lands being relieved beyond their cutting faces, as shown in Fig. 9, similar to the relief of a standard tap.

Thus, the sheared surface 12c, which now comprises a cutting face, has a thread profile 16a which projects, so to speak, since it is located further from the axis of the shank 11 than the thread profile 16b of the adjacent heel surface 12f of the portion 12b. Consequently the profiled sheared surface 12c functions in the same manner as the cutting face of a tap, a radial thread relief being provided behind the thread profile 16b as already explained, due to the initial offsetting of the tip portions 12a and 12b, and the rolling or swaging action of the thread-forming operation.

During the thread-rolling operation, the tip portions 12a and 12b are also brought together in a manner that the juxtaposed portions of the sheared surfaces 12c and 12d engage each other over a large area, and during the driving of the screw into a hole to cut threads therein, these surfaces may function as backing surfaces, reinforcing the tip portions and preventing them from yielding. Due to the rough nature of the sheared surfaces 12c and 12d, an interlocking of these surfaces will be caused during the thread-rolling operation, so that slippage between the surfaces, and shifting of the tip portions with respect to each other, may not occur when the latter are extending into a hole and cutting a thread.

There is thus provided a structure in which the tip or entering portion may be described as having chip receiving grooves or recesses trailing the heel surfaces 12e and 12f, and in which any plane passed through said tip portion between said grooves, i. e. not intersecting either one, gives a cross section of substantially solid screw-tip profile save only for the infinitesimal crack between the shear surfaces. Such a plane would reveal no prominent gaps or reentrant outlines in the tip portions, but rather defines a cross section of continuous nature, and thus serves as a restatement of the proposition that the device has tip portions so related that they reinforce and back each other up.

Due to this engagement between the sheared surfaces 12c and 12d, the depth of the thread cut by the sheared tip and shank portions may be substantial, and as a result when the screw is finally pulled up tight, the fastening thereby provided will withstand stresses in excess of those other self-tapping screw devices are capable of withstanding. The failure point of the self-tapping screw of the present invention compares favorably with the failure point of ordinary screws driven into holes previously threaded by standard taps.

As clearly shown in Figs. 5 and 6, the space, groove, or recess between the heel surface 12f of the tip portion 12b and the cutting face 12c of the tip portion 12a is adequate to accommodate a considerable amount of chips, yet this space has been economically produced by a simple swaging operation done simultaneously with the shearing of the tip.

After the forming of the self-tapping screw of this invention is completed, the metal is hardened, as by a suitable case-hardening process.

By the above construction the self-tapping fastener of the present invention forms a thread in a hole mainly by a cutting action while being driven into the latter, in contradistinction to the combined cutting and swaging action employed by tapping fasteners now in commercial use. Therefore the fastener of this invention may be used with materials such as cast iron, which do not cold flow, and with which prior fasteners may not be satisfactorily used.

Also, the present fastener may be driven into and satisfactorily thread members of substantial thickness, in the order of ⅜" or ½", whether these members be cast iron, or metal capable of cold working.

The threaded holes formed by the present fastener may be used with standard screws if desired to provide a close fit with the latter, since the threads are actually cut in the holes, and closely approach in form the standard thread shape.

When the present self-tapping fastener is driven into a hole, the threads of the fastener are not mutilated or deformed in any way as is the case with prior fasteners, and therefore substantial loads may be withstood, since engaging surfaces are provided between the threads of the fastener and hole which conform in angularity and shape to the standard thread form.

Because the fastener of this invention forms threads mainly by cutting, less driving force is required to start the screw in a hole and also to drive the screw to secured position than is necessary with prior fastening devices. Also, due to the two-part divided tip being provided, which is symmetrical about the screw axis, the screw may be started in proper alignment in a hole without difficulty, and will continue in correct alignment as it is driven home.

The thread-rolling operation performed on the screw shank 11 and tip 12 results in a slight burr 17 on the thread profiles of the cutting faces of the tip portions, this burr being shown in Figs. 5 and 8. However the burr 17 does not adversely effect the thread-cutting of the screw, but may provide the effect of a hook rake, commonly employed in standard taps.

Variations and modification may be made within the scope of this invention and portions of the improvements may be used without others.

I claim:

1. A tapping screw fastener comprising a threaded shank having a threaded, plural-part divided tapering tip, the parts of which have closely juxtaposed backing surfaces adapted to engage and back up each other, and have thread-profile leading edges and trailing edges, said parts being so located with respect to the axis of the shank that the trailing edges are closer to said axis than the leading edges so that the latter constitute cutting faces for cutting a screw thread.

2. A tapping screw fastener comprising a threaded shank having a threaded, two-part centrally sheared and divided tapering tip, the parts of which have closely juxtaposed backing surfaces adapted to engage and back up each other and lying substantially in single axial diametric plane, said parts having profiled leading edges and trailing edges, and being so disposed with respect to each other that the trailing edges are located closer to the axis of the shank than the leading edges so that the latter constitute cutting faces for cutting a screw thread.

3. A tapping screw fastener comprising a threaded shank having a threaded, plural-part divided tapering tip, the parts of which have closely juxtaposed backing surfaces adapted to engage and back up each other, and have profiled leading edges and trailing edges, the latter being spaced from the following or succeeding leading edges to provide chip clearance, and said parts being so located with respect to the axis of the shank that the trailing edges are closer to said axis than the leading edges so that the latter constitute cutting faces for cutting a screw thread.

4. A tapping screw fastener comprising a threaded shank having a threaded, plural-part divided tapering tip, the parts of which have closely juxtaposed backing surfaces adapted to engage and back up each other, and have profiled leading edges and trailing edges, said parts also having heel surfaces located at an angle to said backing surfaces, forming closed-bottom grooves to space the trailing edges from the following or succeeding leading edges so that chip clearance is thereby provided.

5. A tapping screw fastener comprising a threaded shank having a threaded, plural-part divided tapering tip, the parts of which have closely juxtaposed backing surfaces adapted to contact in use, and have profiled leading edges and trailing edges, said parts also having heel surfaces located at an angle to said backing surfaces and the axis of the shank to provide graduated spaces between the trailing edges and the following or succeeding leading edges so that clearance is had for chips.

6. A tapping screw fastener comprising a threaded shank having a threaded, plural-part divided tapering tip the parts of which comprise threaded lands having profiled leading edges and profiled trailing edges, the said lands being progressively relieved between the said edges and the depth of threads in the lands diminishing as the latter are traversed from their leading to their trailing edges.

7. A tapping screw fastener comprising a threaded shank having a threaded, plural-part divided tapering tip the parts of which comprise threaded lands having profiled leading edges and profiled trailing edges, the said lands being progressively relieved between the said edges, the depth of threads in the lands and the distance from the thread crests in the lands to the shank axis diminishing as the lands are traversed from their leading to their trailing edges.

FREDERICK H. MERWIN.

REFERENCES CITED

The following references are of record in the file of this patent:

UNITED STATES PATENTS

| Number | Name | Date |
| --- | --- | --- |
| 2,093,171 | Olson | Sept. 14, 1937 |
| 2,257,441 | Wylie | Sept. 30, 1941 |
| 2,387,720 | Davis | Oct. 30, 1945 |